United States Patent [19]

Tyszkiewicz

[11] 3,809,202

[45] May 7, 1974

[54] LUGGAGE TROLLEYS

[76] Inventor: Stefan Eugene Tyszkiewicz, Villa Les Cypres, Chemin Ermitage, 06 Antibes, France

[22] Filed: June 12, 1972

[21] Appl. No.: 261,653

[30] Foreign Application Priority Data
June 16, 1971 France .............................. 7121893

[52] U.S. Cl. ......................... 194/1 R, 280/33.99 C
[51] Int. Cl. ............................................. G07f 17/00
[58] Field of Search .......... 194/DIG. 18, 35, 67–69, 194/1 R, DIG. 3; 280/33.99 C, 47.34

[56] References Cited
UNITED STATES PATENTS
2,679,302  5/1954  Watson et al. ............... 194/DIG. 18
3,174,768  3/1965  Sanders et al. ............... 280/33.99 C
3,500,965  3/1970  Nossokoff et al. ........... 280/33.99 C

*Primary Examiner*—Robert B. Reeves
*Assistant Examiner*—W. Grant Draggs, Jr.
*Attorney, Agent, or Firm*—Kemon, Palmer & Estabrook

[57] ABSTRACT

A luggage trolley having a brake which is applied when the trolley is laden and which has a coin operable brake release mechanism for releasing the brake whilst the trolley is laden. The brake release mechanism may be arranged to be released by use of a key so that authorised personnel may use the torlley to transport luggage without payment of the appropriate fee.

13 Claims, 10 Drawing Figures

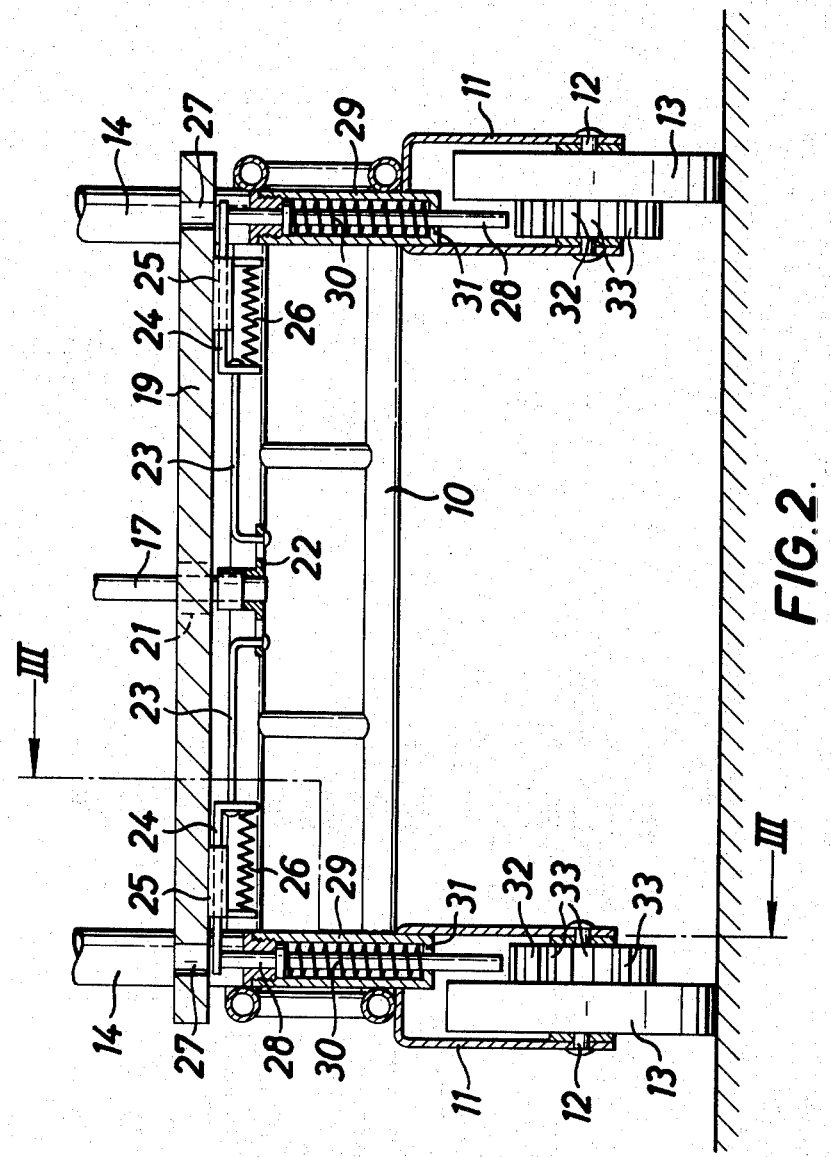

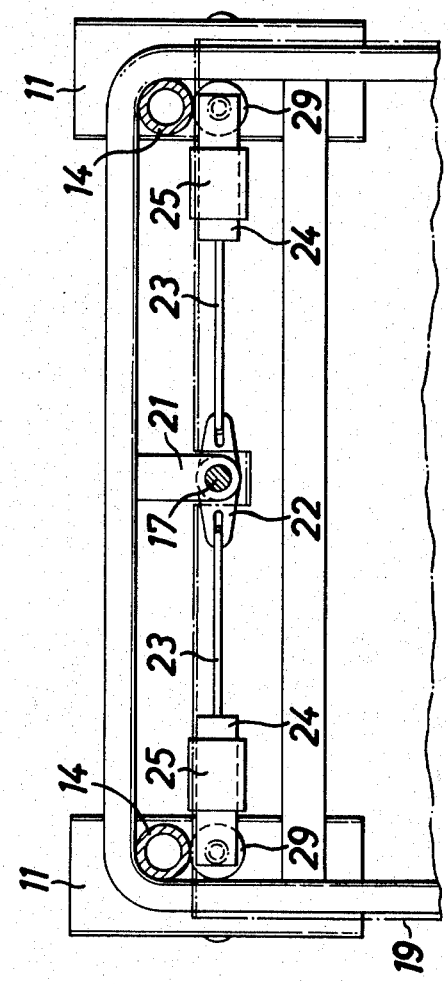
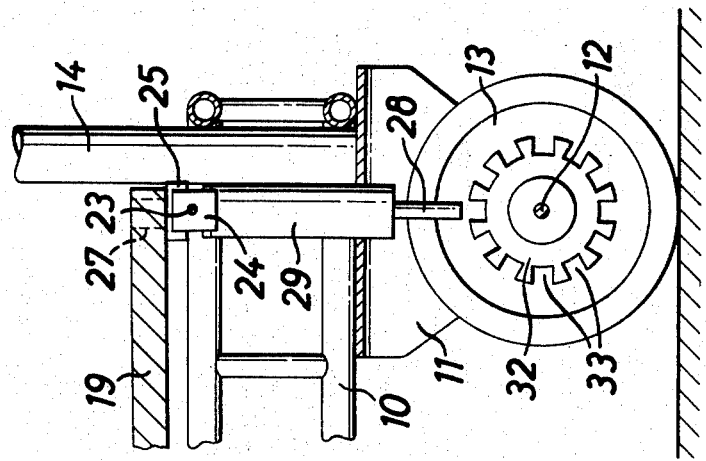
FIG. 4.
FIG. 3.

PATENTED MAY 7 1974

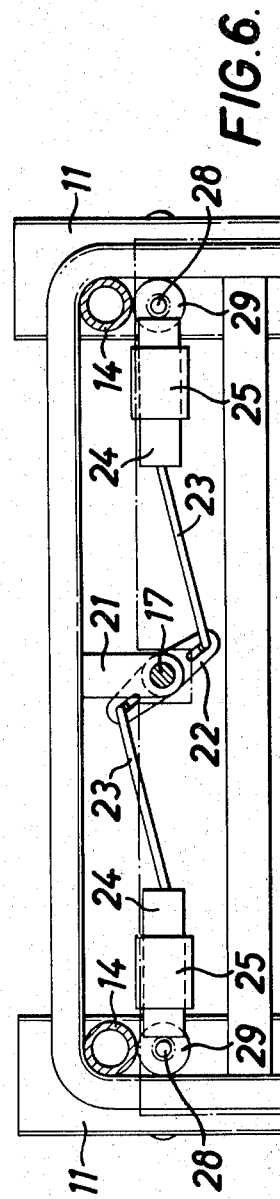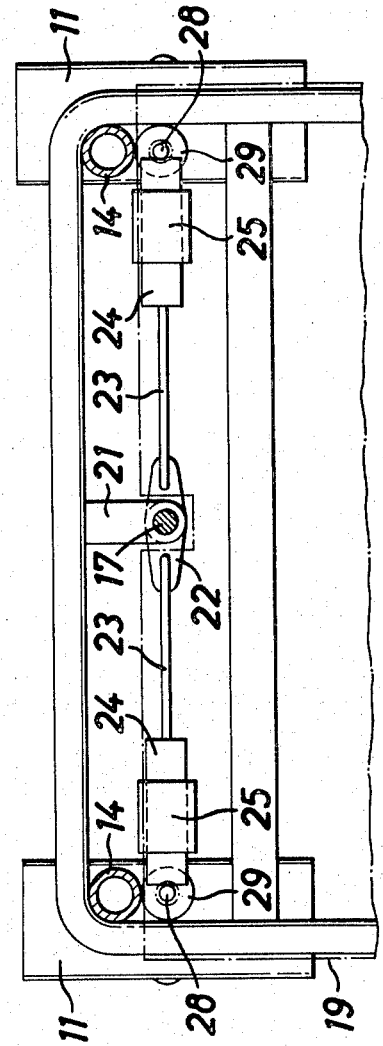

LUGGAGE TROLLEYS

This invention relates to luggage trolleys. The increasing lack of porters at railway stations and at airports creates the need for luggage trolleys to be at the disposal of passengers.

At the present time, even though sometimes a large number of trolleys may be provided for the free use of passengers, the latter generally cannot readily find them as there is a shortage of personnel responsible for returning the trolleys, after they have been used, to the place where they are most needed.

To remedy this inconvenience, this invention is designed to make luggage trolleys profitable, thereby covering not only the cost of their purchase and maintenance, but also facilitating the performance of a service which assures the availability of a sufficient number of trolleys in areas and at times corresponding most closely to the need of the passengers.

At present, a certain number of trolleys is fitted with a brake which insures their utilization on an including surface. This brake is released by hand pressure at the time the trolley is used or moved.

The present invention, while retaining the foregoing features, foresees the entry into action of one or more brakes at the moment a suitcase or another object is placed by the traveller on the trolley platform. In order to release the brake, a coin or token corresponding to a predetermined tariff must be inserted into a suitable slot. The brake may be released also by the use of a key available to service personnel and to acredited porters.

In this way, the manoeuvreability of empty trolleys is assured, while their use by travellers becomes practical and profitable to the authorities or a service company. The interests of the porters are thus also safeguarded.

One embodiment of luggage trolley in accordance with this invention, together with some modifications thereof will be described now by way of example only with reference to the accompanying drawings, of which:

FIG. 2 is a section on the line II — II of FIG. 1 drawn to a larger scale than FIG. 1;

FIG. 3 is a section on the line III — III of FIG. 2;

FIG. 4 is a plan view of part of the luggage trolley of FIGS. 1 – 3 with the luggage platform shown chain-dotted for clarity;

FIG. 6 is a view similar to FIG. 4 showing the brake release mechanism actuated to release the brakes.

FIG. 8 is a view similar to FIG. 6 of the trolley in the condition shown in FIG. 7;

Figure 1:
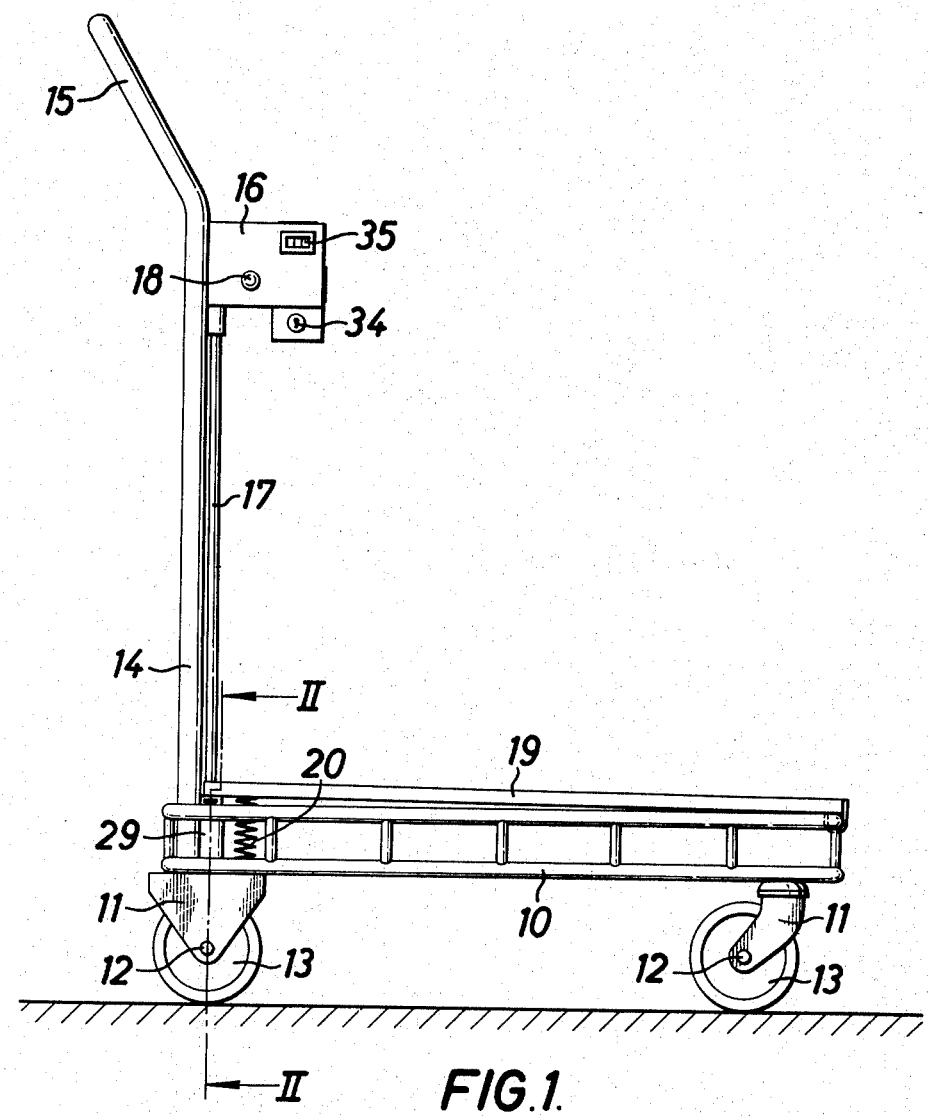
FIG. 1 is a side elevation of an unladen luggage trolley according to this invention.

Referring to FIGS. 1 – 8 of the drawings, the luggage trolley comprises a rectangular base frame 10. At each end of the two longer sides of the frame 10 there is a dependent bracket 11 which carries an axle 12 for a respective wheel 13. At one end of the base frame 10 there are two upstanding posts 14, each post 14 being mounted at a respective corner of the frame 10. The upper ends of the two posts 14 are joined by a cross member 15 which serves as a handle.

A coin operable device 16 is fixed to the two posts 14 so as to extend therebetween below the cross member 15. A shaft 17 depends from the device 16, and is mounted for rotation about its longitudinal axis. The device 16 has a handle 18, a coin inlet slot (not shown) for insertion of a coin or token into the device, gearing for converting movement of the handle 18 into rotary movement of the shaft 17, and resilient means which act in opposition to such rotary movement. The detailed construction and operation of the device 16 forms no part of the present invention and will not be described herein in detail. It is sufficient to appreciate that the device 16 is arranged so that, in normal circumstances, the shaft 17 is driven for rotation by operation of the handle 18 only if a coin or token has been inserted into the coin inlet prior to operation of the handle 18. The coin or token is passed to a coin store in the device 16 after the shaft 17 has been rotated once by operation of the handle 18 so that another coin or token must be inserted for subsequent rotation of the shaft 17 by operation of the handle 18.

A platform 19 is hinged to the frame 10 at the end remote from the posts 14 and is supported at its other end by coil springs 20 which take their reaction from the other end of the frame 10. The shaft 17 passes through an aperture 21 in the platform 19 and carries a laterally extending plate 22 below the platform 19. Two tension rods 23 are connected to the plate 22 by pin and slot couplings and extend laterally therefrom in opposite directions. Each tension rod 23 is pinned at its end remote from the shaft 17 to a dependent limb of a respective L-shaped plate 24. Each L-shaped plate 24 is mounted in a respective support housing 25, which is fixed to the underside of the platform 19, so that the L-shaped plate 24 is guided for movement in a plane parallel to the plane of the platform 19. Each L-shaped plate 24 is urged to the end of its path of movement further from the shaft 17 by a respective coil spring 26. When positioned at the end of its path of movement further from the shaft 17, each L-shaped plate 24 is interposed between a respective hole 27 in the platform 19 and a respective plunger 28. Each plunger 28 is slidable within a tubular housing 29 and is spring loaded upwardly by a respective coil spring 30 which takes its abutment from a lower end wall 23 of the respective tubular housing 29. Each tubular housing 29 is mounted on the frame 10 above the inner end of the axle 12 of the adjacent wheel 13 so that its longitudinal axis intersects the axis of rotation of that wheel 13 and is vertical. The inner end of each axle 12 comprises an enlarged hub portion 32. The radially outer periphery of of each hub portion 32 defines a circumferential array of radially outwardly opening recesses 33.

FIGS. 1 – 4 of the drawings illustrate the arrangement of the trolley when it is unladen. The platform 19 is held in its highest position relative to the frame 10 by the action of the coil springs 20. The plungers 28 are held by the respective coil springs 30 in their highest positions so that the lower end of each plunger 30 is above the nearest hub portion 32 and the upper end is in abutment with the underside of the respective plate 24 which is held in its outer most portion by the respective coil spring 26.

Figure 5:
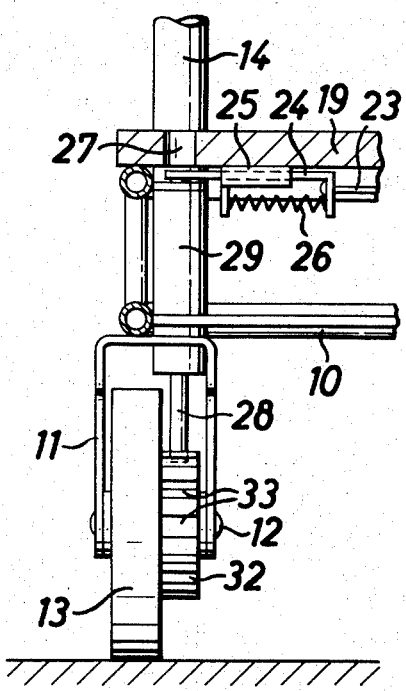
FIG. 5 is a fragmentary sectional view similar to FIG. 2 showing the luggage trolley in its initial laden condition.
Figure 7:
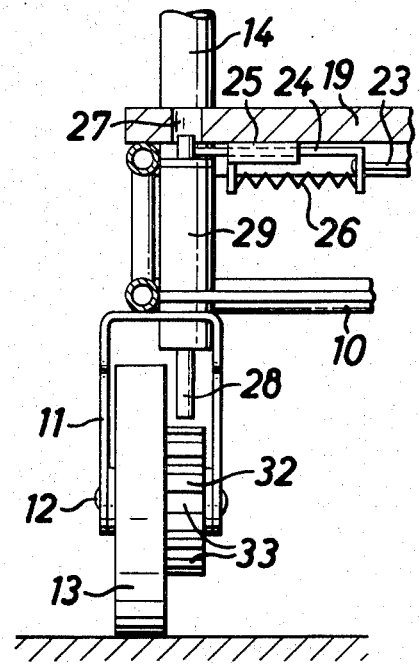
FIG. 7 is a view similar to FIG. 5 showing the trolley laden with the brakes released.

When luggage is placed upon the platform 19 the coil springs 20 yield. The resultant downward pivotal movement of the platform 19 acts through the plates 24 upon the plunger 28 and depresses the plungers 28 so that each of the lower ends of the plungers 28 enters an aligned one of the recesses 33, as shown in FIG. 5 of the accompanying drawings. When the plungers 28 have their lower ends inserted into respective recesses 33, rotation of the respective wheels 13 is prevented.

In order to withdraw the plungers 28 from the aligned recesses 33 without removing the luggage from the platform 19, a customer must insert a coin or token into the coin operable device 16 via the coin inlet thereof. Insertion of a suitable coin or tokens into the device 16 renders the device 16 operable to rotate the shaft 17 against the action of the resilient means following manipulation of the handle 18. The plate 22 is rotated with the shaft 17 so that the two L-shaped plates 24 are drawn inwardly, against the action of the respective coil springs 26, with rotation of the shaft 17. Once the shaft 17 has been rotated sufficiently to draw the two plates 24 to one side of the respective plungers 28 as is shown in FIG. 6, the inserted coin or token is passed to the coin store of the coin operable device 16 and the drive connection between the handle 18 and the shaft 17 is broken. Thereafter the shaft 17 returns to its initial position (as shown in FIG. 8) under the influence of the resilient means. In the meantime, the plungers 28 are urged upwardly out of engagement with the recesses 33 and into the respective holes 27, once the L-shaped plungers 24 have been drawn to one side of the plungers 28, so that the trolley can be moved freely. Thus, when the shaft 17 is returned to its initial position, the two L-shaped plates 24 are moved into abutment with the sides of the respective plungers 28 and are held by the plungers 28 against the action of the coil springs 26, as shown in FIG. 8.

When the luggage is removed from the trolley, the platform 19 is urged upwardly by the coil springs 20 so that the L-shaped plates 24 are moved outwardly, under the influence of the coil springs 26, and are interposed between the plunger 28 and the holes 27 once more.

The coin operable device 16 is provided with an auxiliary key operable device 34 which enables manipulation of the handle 18 to be converted into rotation of the shaft 17, following insertion of a key to unlock a suitable mechanism, without the necessity of inserting a coin or token. Thus the trolley can be used by authorised personnel equipped with a suitable key to carry luggage without payment of the fee.

Additionally the coin operable device 16 may include a counter 35 for counting coins inserted for accounting purposes.

The trolley may be provided with another braking device which is releasable manually and which normally is applied. Provision of such a braking device ensures that the trolley does not roll down a slop unattended when unladen.

Figure 9:
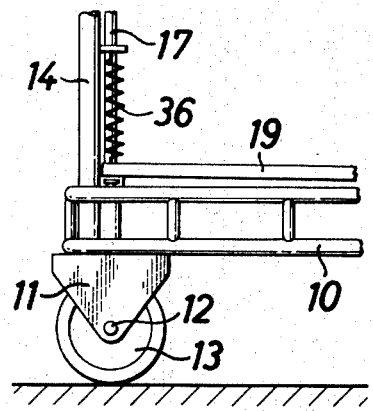
FIG. 9 is a side elevation similar to FIG. 1 of a part of a luggage trolley illustrating one modification.
Figure 10:
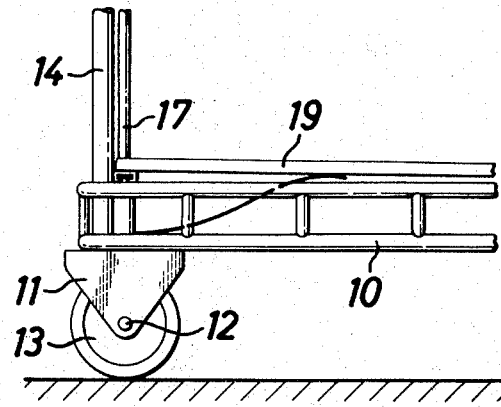
FIG. 10 is a view similar to FIG. 9 illustrating another modification.

The platform 19 may be urged upwardly by a tension spring 36, as shown in FIG. 9, or by a leaf spring as shown in FIG. 10, instead of the coil spring 20 of the trolley illustrated in FIGS. 1 – 8.

Various modifications or refinements of the embodiment of the invention described above may be incorporated without departing from the scope of this invention. For example, the plunger 28 may be arranged to apply a brake pad or a brake shoe to a co-operating part of the associated wheel instead of inserting its end into an aligned recess 33 of the hub portion 32. In place of each hole 27, the platform 19 may be formed with a U-shaped recess in its transverse edge adjacent to the plunger 28.

I claim:

1. A luggage trolley comprising a frame on wheels, a platform carried by the frame and arranged to support luggage, a brake cooperable with one of the wheels, and brake actuating means operable to apply the brake to said one wheel wherein the improvement comprises;

i. means sensitive to the loading of luggage on the platform and arranged to operate said brake actuating means to apply the brake to said one wheel when luggage is supported upon said platform; and ii. A normally inoperative brake release mechanism arranged to be rendered operable to over-ride the brake actuating means and to release the brake from said one wheel when luggage is supported on the platform by the introduction of a special element into said mechanism; the arrangement being such that when luggage is supported on the platform, movement of the luggage trolley is retarded by the brake applied to said one wheel unless said special element is introduced into the brake release mechanism to render the brake release mechanism operable and the brake release mechanism is operated so that the brake is released from said one wheel.

2. A luggage trolley according to claim 1, wherein the improvement further comprises said means sensitive to the loading of luggage on the trolley comprising load responsive means.

3. A luggage trolley according to claim 2, wherein the improvement further comprises said platform being mounted on the frame by resilient mounting means.

4. A luggage trolley according to claim 3, wherein the improvement further comprises said resilient mounting means including a coiled compression spring.

5. A luggage trolley according to claim 3, wherein the improvement further comprises said resilient mounting means including a coiled tension spring.

6. A luggage trolley according to claim 3, wherein the improvement further comprises said resilient mounting means including a leaf spring.

7. A luggage trolley according to claim 3, wherein the improvement further comprises;

i. said brake actuating means including
        a. a plunger mounted on the frame below the platform for movement along a vertical path to apply and release the brake from said one wheel; and
        b. resilient loading means which act to urge said plunger in the brake release direction; and ii. a member which is movable relative to said platform from one position to another position by operation of said brake release mechanism, said member normally being in said one position in which it cooperates with said plunger so that the position of said plunger relative to the frame is determined by the position of the platform relative to the frame, said member being spaced from said plunger in the other position so that said plunger is held in the brake release position by said resilient loading means.

8. A luggage trolley according to claim 7, wherein the improvement further comprises said member being spring loaded into said one position and being mounted on the platform so that it can return to said one position from said other position only when the platform is unladen, said member being held spaced from said one position and against its spring loading by the plunger when luggage is supported on the platform and the plunger is held in its brake released position.

9. A luggage trolley according to claim 7, in which the plunger is disposed above the axle of said one wheel, wherein the improvement further comprises said one wheel having a hub which defines a circumferential array of radially outwardly opening recesses each of which is arranged to receive the adjacent end of the plunger when the plunger is urged downwardly against said resilient loading means by the action of luggage supported on the platform so that rotation of said one wheel is retarded by the plunger.

10. A luggage trolley as claimed in claim 1, wherein the improvement further comprises said brake release mechanism being rendered operable to release the brake by insertion of a coin.

11. A luggage trolley as claimed in claim 10, wherein the improvement further comprises a counting device for counting the number of coins inserted.

12. A luggage trolley as claimed in claim 1, wherein the improvement further comprises said brake release mechanism being rendered operable to release the brake by insertion of a token.

13. A luggage trolley as claimed in claim 1, wherein the improvement comprises said brake release mechanism being rendered operable to release the brakes by the use of a key.

* * * * *